(12) United States Patent
Shen et al.

(10) Patent No.: US 7,761,528 B2
(45) Date of Patent: Jul. 20, 2010

(54) METHOD FOR PROCESSING MULTIPLE CONTINUOUS TOP-K QUERIES

(75) Inventors: Jin-Hsiung Shen, Kaohsiung (TW); Arbee L. P. Chen, Taipei (TW)

(73) Assignee: National Tsing Hua University, Hsinchu (TW)

( * ) Notice: Subject to any disclaimer, the term of this patent is extended or adjusted under 35 U.S.C. 154(b) by 409 days.

(21) Appl. No.: 11/546,145

(22) Filed: Oct. 11, 2006

(65) Prior Publication Data

US 2007/0288475 A1    Dec. 13, 2007

(30) Foreign Application Priority Data

Jun. 8, 2006    (TW) ............................... 95120360 A

(51) Int. Cl.
*G06F 7/00* (2006.01)
(52) U.S. Cl. ............................... 709/208; 707/1; 707/2; 707/4; 707/5; 707/100; 707/104.1; 700/262
(58) Field of Classification Search ...................... 707/7, 707/1, 2, 4, 5, 10, 101, 104.1; 700/262; 709/208
See application file for complete search history.

(56) References Cited

U.S. PATENT DOCUMENTS

2004/0002973 A1*  1/2004  Chaudhuri et al. ............. 707/7

2006/0112090 A1*  5/2006  Amer-Yahia et al. ........... 707/4

FOREIGN PATENT DOCUMENTS

CN    101114291 A  *  1/2008

OTHER PUBLICATIONS

Ame' Lie Marian;Evaluating Top-k Queries Over Web-Accessible Databases;Jun. 2004.;ACM Transactions;vol. 29, No. 2,1-44.*
Zhe Wang et al, Efficient Top-K Query Calculation in Distributed Networks, 2004; ACM, p. 206-215.*
M. Vlachos et al. The Threshold Join Algorithm for Topk Queries in Distributed Sensor Networks, 2005; ACM; p. 61-66.*
R. Fagin, "Combining fuzzy information from multiple systems", in J. comput. System Sci., pp. 58:83-99, 1999. (Enclosed).
R. Fagin, A. Lotem, and M. Naor, "Optimal aggregation algorithm for middleware", in Symposium on Principles of Database System, 2001. (Enclosed).

(Continued)

*Primary Examiner*—Ashok B Patel
*Assistant Examiner*—Evans Desrosiers
(74) *Attorney, Agent, or Firm*—Bucknam and Archer

(57) ABSTRACT

A method for processing multiple continuous Top-K queries, which is performed between a master server and multiple of slave servers, including steps of: a first step, for arbitrarily selecting the multiple of slave servers and querying and counting up K of accumulated values of which are recorded at most; a second step, for calculating every two adjacent values which have been sent from the same servers to obtain an average value as a threshold; and a third step, for measuring variations of an upper bound and a lower bound for each of the values by using the threshold, and reporting to the master server at a time of the value being in excess of the upper bound or lower than the lower bound for each of the values.

2 Claims, 1 Drawing Sheet

OTHER PUBLICATIONS

P. Cao, Z. Wany, ~Efficient Top-K query calculation in distributed networks. In PODC, 2004.(Enclosed.

B. Babcock, C. Olston, "Distributed Top-K monitoring", In PODC, 2003.(Enclosed).

* cited by examiner

METHOD FOR PROCESSING MULTIPLE CONTINUOUS TOP-K QUERIES

BACKGROUND

1. Field of Invention

The invention generally relates to a method for processing multiple continuous Top-K queries.

2. Description of Prior Art

Recently, monitoring application is an interesting research in a wider field. In data stream, most of the applications, such as wireless sensing network or utilization rate analysis for a network all need to be processed by continuous queries and need to report results. In such an application, it is not useful for transmission of a large amount of the data stream to a centralized processing system and for an extremely long response time. In past, most of algorithms are concentrating on an one-time query, and are not adapted to process multiple of monitoring simultaneously because they are not possible to check the result which varies. Of course, it is possible for these algorithms to simulate efficacy of the monitoring by repetition of operations. However, supposed that the result did not vary, the repeating operations were all wasted. Even if there is a proposed algorithm which may process continuous queries, it still has problems from lack of information sharing and a mechanism for lowering heavy loading. For solving these problems, the present invention has disclosed a method for processing multiple continuous Top-K queries.

In the beginning, the system always has no information for sharing. If the system is requested for processing any queries, the system will report the current results by using Fagin algorithm and establish a RLT (Ranked List Table). Subsequently, if any server in the system finds out the variation of the RLT occurred, the server will utilize one of three operations to correct the accuracy of the varied RLT. However, such a case does not happen frequently, sometimes several predetermined threshold being exceeded can be happened. If there is the RLT sharing information, the system can process any of new queries by employing the RLT information or the method combined RLT and the Fagin algorithm. Finally, it should be taken into consideration that the system must report the accurate results continuously. When any server in the system found that the result will possibly varies, the system will employ a scheme of access ordering again that is performed in between the RLT and servers in order to reduce data transmission and achieve a faster response.

Three algorithms proposed in documents 1 to 3 are all focusing on the one-time Top-K query. When these algorithms for processing continuous Top-K query are used, the system can only perform these algorithms repeatedly to obtain a new Top-K result because there is no any mechanism to monitor the variation of the Top-K results at present. To repeat the operation of these algorithms always waste the system resources and increase the system loading. In particular, when the Top-K result has no variation, the repeat operations for these algorithms are all redundant. Thus the frequent operations will be an adverse factor for query. Whereas, if lower the frequency of repeated using these algorithms for operations, the system can not respond in time when the result of Top-K varies. Therefore, for the continuous Top-K query, these above-described algorithms have significant disadvantages.

In a method of document 4, there is a proposed mechanism for a single continuous Top-K query. This method is focusing on a single query, so that when the system received a plurality of Top-K queries, all of the relevant steps should be processed repeatedly whether the requests are coming simultaneously or in order. The proposed method doesn't teach any mechanism which has information sharing scheme for processing data in advance before starting the process for continuous query. In addition, when the proposed method is used for processing a continuous Top-K query, the system should receive data from all associated nodes (i.e, servers) which need to support the data. For a distributed networks system, this method which needs to receive all of related data is not a practical manner.

[Reference Documents]
1. R. Fagin, "Combining fuzzy information from multiple systems", in J. comput. System Sci., pages 58:83-99, 1999.
2. R. Fagin, A. Lotem, and M. Naor, "Optimal aggregation algorithm for middleware", in Symposium on Principles of Database System, 2001.
3. P. Cao, Z. Wany, "Efficient Top-K query calculation in distributed networks". In PODC, 2004.
4. B. Babcock, C. Olston, "Distributed Top-K monitoring", In PODC, 2003.

In terms of the above-described problems, the inventor has found a complete mechanism and algorithm for solution of multiple Top-K queries. In general, the data transmission and response can be improved largely.

SUMMARY OF INVENTION

The object of the invention is to provide a complete mechanism, capable of processing a large amount of continuous queries and obtaining the accurate results in a lower cost and a faster response time for communication. Herein, the object can be achieved by retaining accuracy of RLT and applying RLT.

For achieving the object, according to the invention, a method for processing multiple continuous Top-K queries is provided, which is performed in between a master server and multiple of slave servers, including steps of: a first step for arbitrarily selecting the multiple of slave servers and querying K of accumulated values of which are recorded at most, and counting up the K of the accumulated values; a second step for calculating every two adjacent values which has been sent from the same slave server to obtain an average value as a threshold; and a third step for measuring variations of an upper bound and a lower bound for each value by using the threshold, and reporting to the master server at a time of the value being in excess of the upper bound or lower than the lower bound for each value.

DETAILED DESCRIPTION OF INVENTION

Figure 1:
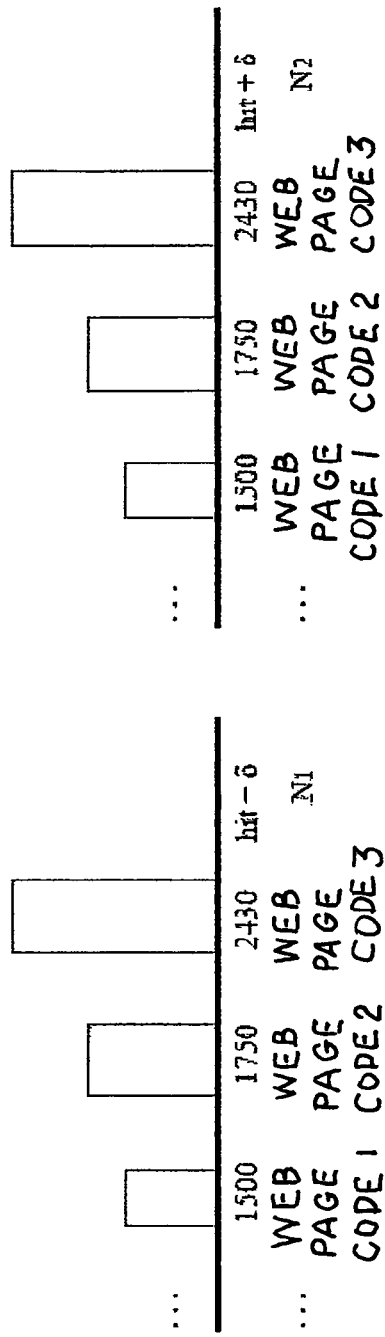
FIG. 1 shows two graphs, illustrating results of simulated query 1 after parameters received by severs N1 and N2 in Table 3, respectively.

Hereinafter, an embodiment that exemplarily needs to be processed multiple continuous queries is described. Firstly, a whole system is generally illustrated where four severs having similar web contents are arranged in the system and distributed in different areas like Asia, America, Europe, and so on. For sake of simplification, these four servers are respectively referred to as N1, N2, N3 and N4. Further, there exists a main server for handling the continuous queries, which is referred to as N0. Table 1 shows contents of these four servers (ordering based on number of clicks to the web page).

In addition, different users or web service people will care on what needs to be informed by the system that the previous Top-K pages are located at which specified servers. In the embodiment, it is assumed that k is 2, thus the results for queries are all in focus on a first order and a second order.

Supposed that there are three continuous queries described as the following:

Query 1: Which two webs are most-frequently browsed in N1 and N2?

Query 2: Which two webs are most-frequently browed in N3 and N4?

Query 3: Which two webs are most-frequently browsed in N2 and N3?

Here, the Query 1 and Query 2 will arrive at the same time, and the Query 3 will arrive after the system having reported the Top-2 results of both Queries 1 and 2.

For the Query 1, because there is no any previous query data processed before in the beginning, the server N0 will firstly request N1 and N2 to report web ID and number of clicks for this ID. When N0 finds that there are at least two IDs which have bean reported by the N1 and N2, N0 will cease requesting the servers N1 and N2 to report next ID and number of clicks of the next ID.

Further, for the reported IDs, a threshold will be calculated between every two reported IDs of the same server by summean of number of clicks for these two IDs. The steps for the Query 2 are the same as those of the Query 1. Table 2 shows contents of servers N0, N1, N2, N3, and N4 after completing the above described step.

Here, a RLT (Ranked List Table) has been automatically set up. Therefore, the server N0 can calculate which IDs are possible to be the result for Top-K. In terms of the Query 1:

number of clicks on $ID1 \leq 2000+$number of clicks on $ID4=3000$ number of clicks on $ID2=1700+1800=3500$ number of clicks on $ID3=1840+3020=4860$ number of clicks on $ID5 \leq$number of clicks on $ID6+2780=3980$, thus ID1 is not possible to be Top-2 and can be deleted at first. ID5 can not be determined until number of clicks on ID5 from the server N1 was received by N0. Such an action is referred to as random access. Here, provided that number of clicks on ID5 reported by N1 is 0, then the number of clicks on ID5 becomes 2780. Thus, the first order shall be ID3 and the second order shall be ID2. At the time for processing Query 3, because N0 exists the information of RLT, the N0 will check RLT firstly. N0 founds that two IDs has been listed simultaneously in the tables of N2 and N3. The result is that ID3 and ID5 satisfy such a condition. Then, the server N0 starts to calculate which IDs are possible to be the Top-K result.

The following is the calculated results from N0 by using the Threshold:

$T3,2=1400 \leq$number of clicks on $ID2 \leq T2,2+T3,3=2290+1015=3305$ $T1,2+T3,3=2900+1015=3915 \leq$number of clicks on $ID3$ $T2,3=1210 \leq$number of clicks on $ID4 \leq T3,2+T1,3=1400+1360=2760$ $T2,2+T1,3=2290+1360=3650 \leq$number of clicks on $ID5$.

Because the upper bounds of ID2 and ID4 (3305 and 2760, respectively) are all smaller than the lower bound of ID3 or ID5 (3915 and 3650), the server N0 can only acquire the current total number of clicks on ID3 and ID5. Further, due to the existence of the information of RLT in this embodiment, it can be saved 4 times of access. If it still employ the conventional method, the codes of the previous 4 web pages should be found and the total number of clicks needs 8 times of access to be calculated.

Supposed that the initial Top-2 result has been obtained, the system should indicate the servers N1, N2, N3, and N4 to judge by themselves whether the Top-2 result has varied. For example, in case of Query 1, after the N0 obtained the Top-2 result, the corresponding parameters calculated from the current number of clicks on IDs will be:

Parameter of $ID1$ of $N1=3000/2-2000=-500$

Parameter of $ID2$ of $N1=3500/2-1700=50$

Parameter of $ID3$ of $N1=4860/2-1840=590$

Parameter of $ID5$ of $N1=2780/2-0=1390$

Parameter of $ID1$ of $N2=3000/2-1000=500$

Parameter of $ID2$ of $N2=3500/2-1800=-50$

Parameter of $ID3$ of $N2=4860/2-3020=-590$

Parameter of $ID5$ of $N2=2780/2-2780=-1390$

The server N0 will transmit these above parameters to the corresponding servers Ni (i.e, $1 \leq i \leq 4$). The table 3 and FIG. 1 show the results of the Query 1 that are simulated by servers N1 and N2 after they received the corresponding parameters.

Figure 2:
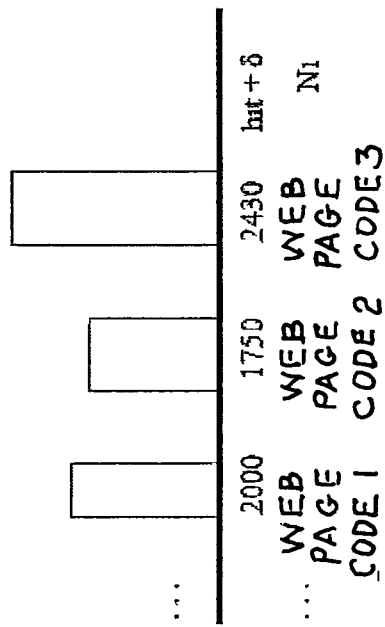
FIG. 2 is a schematic drawing, showing variation of result of Top-2 occurred.

The N1 will request the N0 to recalculate Top-2 result if the simulated Top-2 result has varied in Ni. For example, number of clicks on ID1 of Query 1 increases 500, as shown in FIG. 2. It varies the simulated Top-2 result, and then the result should be recalculated.

In summary, in addition that the method of the present invention has the advantages of cost effectiveness and faster response for processing the subsequently continuous Top-K queries, the method of the present invention can also possess the advantages of large calculation rate that each of the Ni is capable of judging the current Top-K result for the successive processing by itself. However, in the conventional method, the N0 should request all related web page code and number of clicks for calculating all of the corresponding parameters. Therefore, the method of the present invention is advantageous for processing multiple continuous queries.

Having thus described the embodiment of the invention, it is to be appreciated various alterations, modifications, and improvements will readily occur to those skilled in the art, for example, the present invention can apply to the monitoring for wireless sensor or webs, etc. Therefore, such alterations, modifications, and improvements are intended to be part of this disclosure, and are intended to be within the spirit and scope of the invention defined in the appended claims.

Table 1 shows the contents of 4 servers.
Table 2 shows the contents of N0, N1, N2, N3, and N4 after N0 process Query 1 and Query 2.
Table 3 shows the results of Query 1 that are simulated by servers N1 and N2 after they received the corresponding parameters.

TABLE 1 contents of N1, N2, N3 and N4

| N1 | | N2 | |
|---|---|---|---|
| Web page code | Number of clicks | Web page code | Number of clicks |
| 1 | 2000 | 3 | 3020 |
| 3 | 1840 | 5 | 2780 |
| 2 | 1700 | 2 | 1800 |
| 6 | 1200 | 4 | 1000 |
| ... | ... | ... | ... |

| N3 | | N4 | |
|---|---|---|---|
| Web page code | Number of clicks | Web page code | Number of clicks |
| 5 | 1400 | 4 | 2020 |
| 4 | 1320 | 6 | 1780 |
| 3 | 1100 | 3 | 1400 |
| 6 | 930 | 7 | 1140 |
| ... | ... | ... | ... |

TABLE 2

N0

| N1 | | N2 | | N3 | | N4 | |
|---|---|---|---|---|---|---|---|
| Web page code | Number of clicks | Web page code | Number of clicks | Web page code | Number of clicks | Web page code | Number of clicks |
| 1 | 2000 | 3 | 3020 | 5 | 1400 | 4 | 2020 |
| T1,1 | 1920 | T1,2 | 2900 | T1,3 | 1360 | T1,4 | 1900 |
| 3 | 1840 | 5 | 2780 | 4 | 1320 | 6 | 1780 |
| T2,1 | 1770 | T2,2 | 2290 | T2,3 | 1210 | T2,4 | 1590 |
| 2 | 1700 | 2 | 1800 | 3 | 1100 | 3 | 1400 |
| T3,1 | 1450 | T3,2 | 1400 | T3,3 | 1015 | T3,4 | 1270 |
| 6 | 1200 | 4 | 1000 | 6 | 930 | 7 | 1140 |

| N1 | | N2 | |
|---|---|---|---|
| Web page code | Number of clicks | Web page code | Number of clicks |
| 1 | 2000 | 3 | 3020 |
| T1,1 | 1920 | T1,2 | 2900 |
| 3 | 1840 | 5 | 2780 |
| T2,1 | 1770 | T2,2 | 2290 |
| 2 | 1700 | 2 | 1800 |
| T3,1 | 1450 | T3,2 | 1400 |
| 6 | 1200 | 4 | 1000 |
| ... | ... | ... | ... |

| N3 | | N4 | |
|---|---|---|---|
| Web page code | Number of clicks | Web page code | Number of clicks |
| 5 | 1400 | 4 | 2020 |
| T1,3 | 1360 | T1,4 | 1900 |
| 4 | 1320 | 6 | 1780 |
| T2,3 | 1210 | T2,4 | 1590 |
| 3 | 1100 | 3 | 1400 |
| T3,3 | 1015 | T3,4 | 1270 |
| 6 | 930 | 7 | 1140 |
| ... | ... | ... | ... |

TABLE 3

| N1 | | | N2 | | |
|---|---|---|---|---|---|
| Web page code | Number of clicks | Query 1:δ | Web page code | Number of clicks | Query 1:δ |
| 1 | 2000 | −500 | 3 | 3020 | −590 |
| T1,1 | 1980 | | T1,2 | 2900 | |
| 3 | 1840 | 590 | 5 | 2780 | −1390 |
| T2,1 | 1770 | | T2,2 | 2290 | |
| 2 | 1700 | 50 | 2 | 1800 | −50 |
| T3,1 | 1450 | | T3,2 | 1400 | |
| 6 | 1200 | 0 | 4 | 1000 | 0 |
| ... | ... | 0 | 1 | ... | 500 |
| 5 | 0 | 1390 | ... | ... | 0 |

What is claimed is:

1. A method for processing multiple continuous Top-K queries, which is performed between a master server and multiple of slave servers each containing a multiple of web IDs, comprising the steps of:

a first step, whereby the master server selects the multiple of query designated slave servers, and for continuous top-K queries, queries and counts up K of sum-mean number of clicks of the web IDs which are the largest recorded for the selected slave servers;

a second step, whereby the master server calculates an average of every two adjacent sum-mean number of clicks of the web IDs which have been sent from the selected slave servers to obtain threshold values, the threshold values are then communicated to the selected slave servers which then set up respective Ranked List Tables from the sum-mean number of clicks of the respective web Ids and the threshold values;

a third step, whereby using the threshold values the master server calculates upper bound and lower bound values of the web IDs and communicates these values to the respective selected slave servers;

a fourth step, whereby the selected slave servers communicate to the master server when a new web ID value is in excess of the upper bound value or lower than the lower bound value of that web ID; and a fifth step, whereby the master server determines whether the new web ID value changes the Top-K and if it does not the master server uses the new web ID Value to calculate a new threshold value for the related web ID which is communicated to the respective slave server.

2. The method for processing multiple continuous Top-K queries as defined in claim 1, which further comprises a step whereby the master server calculates parameters based on the sum-mean number of clicks of the web Ids and communicates these parameters to the respective slave servers which then establish a simulated Top-K result, and when a new value of a web ID equals or exceeds the parameter associated with that web ID thereby varying the simulated Top-K result, the respective slave server communicates the new web ID value to the master server for recalculation of the Top-K.

* * * * *